United States Patent
Lee et al.

(10) Patent No.: US 12,401,061 B2
(45) Date of Patent: Aug. 26, 2025

(54) NON-AQUEOUS ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jung Min Lee, Daejeon (KR); Young Min Lim, Daejeon (KR); Chul Eun Yeom, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 748 days.

(21) Appl. No.: 17/766,629

(22) PCT Filed: Jun. 22, 2021

(86) PCT No.: PCT/KR2021/007824
§ 371 (c)(1),
(2) Date: Apr. 5, 2022

(87) PCT Pub. No.: WO2021/261886
PCT Pub. Date: Dec. 30, 2021

(65) Prior Publication Data
US 2023/0253619 A1   Aug. 10, 2023

(30) Foreign Application Priority Data
Jun. 22, 2020 (KR) .................. 10-2020-0075580

(51) Int. Cl.
| | | |
|---|---|---|
| H01M 10/0567 | (2010.01) | |
| H01M 10/052 | (2010.01) | |
| H01M 10/0568 | (2010.01) | |
| H01M 10/0569 | (2010.01) | |
| H01M 10/0587 | (2010.01) | |
| H01M 50/46 | (2021.01) | |

(52) U.S. Cl.
CPC ..... *H01M 10/0567* (2013.01); *H01M 10/052* (2013.01); *H01M 10/0568* (2013.01); *H01M 10/0569* (2013.01); *H01M 10/0587* (2013.01); *H01M 50/46* (2021.01); *H01M 2300/0037* (2013.01); *H01M 2300/0051* (2013.01)

(58) Field of Classification Search
CPC ......... H01M 10/0567; H01M 10/0568; H01M 10/0569
See application file for complete search history.

(56) References Cited

U.S. PATENT DOCUMENTS

| | | | | |
|---|---|---|---|---|
| 10,347,940 | B2 * | 7/2019 | Kim | ........... H01M 10/0569 |
| 10,734,681 | B2 * | 8/2020 | Lee | ........... H01M 10/056 |
| 11,380,937 | B2 * | 7/2022 | Zheng | ........... C07D 317/36 |
| 2008/0020287 | A1 * | 1/2008 | Cho | ........... H01G 9/04 |
| | | | | 429/339 |
| 2012/0196191 | A1 | 8/2012 | Jeon et al. | |
| 2012/0202124 | A1 | 8/2012 | Jeon et al. | |
| 2013/0004861 | A1 | 1/2013 | Yu et al. | |
| 2013/0011715 | A1 | 1/2013 | Lee et al. | |
| 2014/0072865 | A1 | 3/2014 | Suh et al. | |
| 2014/0093787 | A1 | 4/2014 | Abe et al. | |
| 2015/0221985 | A1 | 8/2015 | Abe | |
| 2015/0333370 | A1 | 11/2015 | Abe et al. | |
| 2017/0179528 | A1 | 6/2017 | Lee et al. | |
| 2017/0288268 | A1 | 10/2017 | Kim et al. | |
| 2018/0166746 | A1 | 6/2018 | Shimamoto et al. | |
| 2018/0198166 | A1 | 7/2018 | Abe | |

(Continued)

FOREIGN PATENT DOCUMENTS

| | | |
|---|---|---|
| CN | 103229342 A | 7/2013 |
| CN | 103238249 A | 8/2013 |

(Continued)

OTHER PUBLICATIONS

Search report from International Application No. PCT/KR2021/007824, mailed Oct. 31, 2021.
Extended European Search Report including Written Opinion for Application No. 21829136.7 dated Mar. 19, 2024, pp. 1-8.

*Primary Examiner* — Amanda C. Walke
(74) *Attorney, Agent, or Firm* — Lerner David LLP

(57) ABSTRACT

A non-aqueous electrolyte and a lithium secondary battery including the same are disclosed herein. The non-aqueous electrolyte may be used in a high-voltage battery to achieve excellent life characteristics. In some embodiments, a non-aqueous electrolyte includes an organic solvent, a lithium salt, a compound represented by Formula 1, and a compound represented by Formula 2, wherein, when an amount of the compound represented by Formula 1 is X wt % and an amount of the compound represented by Formula 2 is Y wt % based on a total weight of the non-aqueous electrolyte, X and Y satisfy $X+Y \leq 5$ and $X \leq Y$,

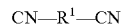

[Formula 1]

$R^1$ is an unsaturated hydrocarbon group

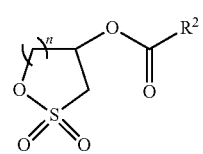

[Formula 2]

$n$ is an integer of 1 or 2, and $R^2$ is hydrogen, an unsubstituted or substituted alkyl group, or an unsubstituted or substituted alkoxy group.

15 Claims, No Drawings

(56) References Cited

U.S. PATENT DOCUMENTS

| | | | |
|---|---|---|---|
| 2018/0248226 A1 | 8/2018 | Kono et al. | |
| 2019/0198928 A1 | 6/2019 | Shimamoto et al. | |
| 2020/0243907 A1 | 7/2020 | Zhang et al. | |
| 2020/0388884 A1 | 12/2020 | Kawakami | |
| 2021/0320334 A1 | 10/2021 | Shimamoto et al. | |
| 2023/0198096 A1* | 6/2023 | Peng | H01M 50/489 |
| | | | 429/145 |

FOREIGN PATENT DOCUMENTS

| | | | | |
|---|---|---|---|---|
| CN | 104508896 A | | 4/2015 | |
| CN | 104584311 A | | 4/2015 | |
| CN | 105529498 A | | 4/2016 | |
| CN | 105720304 A | * | 6/2016 | |
| CN | 105830270 A | | 8/2016 | |
| CN | 106471662 A | * | 3/2017 | H01G 11/06 |
| CN | 107017429 A | | 8/2017 | |
| CN | 107017432 A | * | 8/2017 | C07C 255/09 |
| CN | 107919498 A | * | 4/2018 | H01M 10/0525 |
| CN | 107017432 B | | 2/2019 | |
| CN | 109860703 A | | 6/2019 | |
| CN | 110021785 A | | 7/2019 | |
| CN | 110061176 A | | 7/2019 | |
| CN | 112054239 A | * | 12/2020 | |
| EP | 2882030 A1 | | 6/2015 | |
| JP | H07176322 A | | 7/1995 | |
| JP | 2014-524112 A | | 9/2014 | |
| JP | 2017063019 A | | 3/2017 | |
| KR | 20130003583 A | | 1/2013 | |
| KR | 20140032918 A | | 3/2014 | |
| KR | 20150039751 A | | 4/2015 | |
| KR | 20170072032 A | | 6/2017 | |
| KR | 20170114389 A | | 10/2017 | |
| KR | 20180050373 A | | 5/2018 | |
| KR | 20190054920 A | | 5/2019 | |
| KR | 20200039586 A | * | 4/2020 | |
| WO | 2012/147818 A1 | | 11/2012 | |
| WO | 2019189413 A1 | | 10/2019 | |

* cited by examiner

NON-AQUEOUS ELECTROLYTE FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2021/007824, filed on Jun. 22, 2021, which claims priority from Korean Patent Application No. 10-2020-0075580, filed on Jun. 22, 2020, the disclosures of which are incorporated by reference herein.

TECHNICAL FIELD

The present invention relates to a non-aqueous electrolyte for a lithium secondary battery and a lithium secondary battery including the same, and more particularly, to a non-aqueous electrolyte, which may be used in a battery operated at a high voltage of 4.45 V or higher to exhibit excellent life characteristics, and a lithium secondary battery including the same.

BACKGROUND ART

Recently, interests in energy storage technologies have been increasingly grown, and efforts for research and development of electrochemical devices have been gradually materialized as the application of the energy storage technologies is expanded to the energy of mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

An electrode assembly is formed by disposing a separator between a positive electrode including a positive electrode active material formed of a transition metal oxide containing lithium and a negative electrode including a negative electrode active material capable of storing lithium ions, and, after the electrode assembly is inserted into a battery case, a lithium secondary battery is generally prepared by a method of injecting a non-aqueous electrolyte that becomes a medium for delivering lithium ions and then sealing the battery case. The non-aqueous electrolyte is generally composed of a lithium salt and an organic solvent capable of dissolving the lithium salt.

Recently, a high-voltage secondary battery operated at a high voltage is being actively developed as the demand for a secondary battery having high energy density, such as a battery for an electric vehicle, increases. However, in a case in which the operating voltage is increased, decomposition of an electrolyte solution is accelerated due to structural collapse on a surface of the positive electrode, transition metal dissolution, and gas generation, and a destruction and regeneration reaction of a solid electrolyte interphase (SEI) on a surface of the negative electrode proceeds to increase an electrolyte solution depletion rate, and, as a result, there is a problem in that life characteristics of the battery are rapidly degraded.

Therefore, there is a need to develop a non-aqueous electrolyte which may improve the life characteristics of the high-voltage battery.

DISCLOSURE OF THE INVENTION

Technical Problem

An aspect of the present invention provides a non-aqueous electrolyte, which may exhibit excellent life characteristics when used in a high-voltage battery with an operating voltage of 4.45 V or higher by including a combination of a dinitrile compound containing a double bond and a sultone-based compound containing an ester group in a specific content range, and a lithium secondary battery including the same.

Technical Solution

According to an aspect of the present invention, there is provided a non-aqueous electrolyte including an organic solvent, a lithium salt, a compound represented by Formula 1, and a compound represented by Formula 2, wherein, when an amount of the compound represented by Formula 1 is X wt % and an amount of the compound represented by Formula 2 is Y wt % based on a total weight of the non-aqueous electrolyte, X and Y satisfy X+Y≤5 and X≤Y.

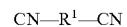  [Formula 1]

In Formula 1, $R^1$ is an unsaturated hydrocarbon group having 2 to 10 carbon atoms which includes at least one double bond.

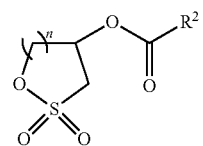  [Formula 2]

In Formula 2, n is an integer of 1 or 2, and $R^2$ is hydrogen, an unsubstituted or substituted alkyl group having 1 to 10 carbon atoms, or an unsubstituted or substituted alkoxy group having 1 to 10 carbon atoms.

For example, the compound represented by Formula 1 may be 1,4-dicyano-2-butene, and the compound represented by [Formula 2] may be 2-acetoxy-1,3-propanesultone.

The compound represented by Formula 1 may be included in an amount of 0.1 wt % to 3 wt % based on a total weight of the non-aqueous electrolyte, and the compound represented by Formula 2 may be included in an amount of 0.1 wt % to 3 wt % based on the total weight of the non-aqueous electrolyte.

Also, the compound represented by Formula 1 and the compound represented by Formula 2 may be included in a weight ratio of 1:1 to 1:3.

The non-aqueous electrolyte may further include a compound represented by Formula 3, and the compound represented by Formula 3, for example, may be hexane tricyanide.

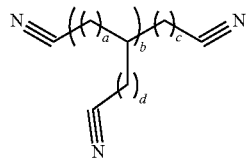

[Formula 3]

In Formula 3, a, b, c, and d are each independently one of an integer of 1 to 5.

The compound represented by Formula 3 may be included in an amount of 0.1 wt % to 3 wt % based on the total weight of the non-aqueous electrolyte.

Specifically, the non-aqueous electrolyte may include 0.5 wt % to 3 wt % of the compound represented by Formula 1; 0.5 wt % to 3 wt % of the compound represented by Formula 2; and 0.5 wt % to 3 wt % of the compound represented by [Formula 3].

The organic solvent may include a cyclic carbonate-based solvent and a propionate-based solvent, and, in this case, the organic solvent may include the cyclic carbonate-based solvent and the propionate-based solvent in a volume ratio of 10:90 to 50:50.

According to another aspect of the present invention, there is provided a lithium secondary battery including: an electrode assembly which includes at least one positive electrode, at least one negative electrode, and at least one separator disposed between the positive electrode and the negative electrode, and the non-aqueous electrolyte according to the present invention.

In this case, the lithium secondary battery may be a high-voltage lithium secondary battery operated at a voltage of 4.45 V or higher.

Also, the electrode assembly may be a stack and folding type electrode assembly in which unit cells are wound by a long continuous separation film.

Advantageous Effects

A non-aqueous electrolyte of the present invention is characterized in that an unsaturated dinitrile-based compound containing a double bond and a sultone-based compound containing an ester group are used together in specific amounts. Since the unsaturated dinitrile-based compound contains a double bond in the center of its structure, it has an abundant electron cloud, and, as a result, it may form a strong bond with transition metal on a surface of a positive electrode. That is, in a case in which the unsaturated dinitrile-based compound is used as an electrolyte solution additive, since the unsaturated dinitrile-based compound may bind with transition metal with a greater binding energy in comparison to a case where a saturated dinitrile-based compound, such as succinonitrile, is added, transition metal dissolution and a side reaction with an electrolyte solution on the surface of the positive electrode may be more effectively suppressed, and, as a result, gas generated from the positive electrode at high voltage and high temperature may be reduced and performance may be improved.

Also, with respect to the sultone compound containing an ester group, since a reduction reaction occurs more easily than an unsubstituted sultone compound such as 1,3-propanesultone, it is easy to form a solid electrolyte interphase (SEI) on a surface of a negative electrode and an SEI with lower resistance and favorable life characteristics may be formed.

Thus, if the non-aqueous electrolyte of the present invention including the unsaturated dinitrile-based compound and the sultone-based compound containing an ester group is used, excellent low-temperature life characteristics and high-temperature life characteristics may be obtained when used in a high-voltage battery with an operating voltage of 4.45 V or higher.

MODE FOR CARRYING OUT THE INVENTION

Hereinafter, the present invention will be described in detail.

Non-Aqueous Electrolyte

A non-aqueous electrolyte according to the present invention includes (1) an organic solvent, (2) a lithium salt, (3) a compound represented by the following Formula 1, and (4) a compound represented by the following Formula 2, wherein, when an amount of the compound represented by [Formula 1] is X wt % and an amount of the compound represented by Formula 2 is Y wt % based on a total weight of the non-aqueous electrolyte, X and Y satisfy X+Y≤5 and X≤Y.

Also, the non-aqueous electrolyte according to the present invention may further include a compound represented by Formula 3, if necessary.

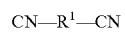

[Formula 1]

In Formula 1, $R^1$ is an unsaturated hydrocarbon group having 2 to 10 carbon atoms which includes at least one double bond.

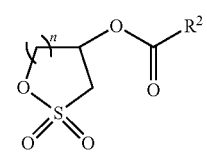

[Formula 2]

In Formula 2, n is an integer of 1 or 2, and $R^2$ is an unsubstituted or substituted alkyl group having 1 to 10 carbon atoms.

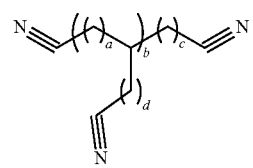

[Formula 3]

In Formula 3, a, b, c, and d are each independently one of an integer of 0 to 5.

Hereinafter, each component of the non-aqueous electrolyte of the present invention will be described in more detail.

(1) Organic Solvent

In the present invention, the organic solvent may include a cyclic carbonate-based solvent, a linear carbonate-based solvent, a linear ester-based solvent, or a mixture thereof. For example, the organic solvent may be a mixture of the cyclic carbonate-based solvent and the linear carbonate-based solvent or a mixture of the cyclic carbonate-based solvent and the linear ester-based solvent.

The cyclic carbonate-based solvent is an organic solvent which may well dissociate the lithium salt in the electrolyte due to high permittivity as a highly viscous organic solvent, wherein, for example, the cyclic carbonate-based solvent may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate. Specifically, the cyclic carbonate-based solvent may be ethylene carbonate, propylene carbonate, and a mixture thereof, and may more specifically be a mixture of ethylene carbonate and propylene carbonate.

The linear carbonate-based solvent is an organic solvent having low viscosity and low permittivity, wherein, for example, the linear carbonate-based solvent may be at least one selected from the group consisting of dimethyl carbonate (DMC), diethyl carbonate (DEC), dipropyl carbonate, ethyl methyl carbonate (EMC), methylpropyl carbonate, and ethylpropyl carbonate. The linear carbonate-based solvent may specifically be diethyl carbonate.

The linear ester-based solvent, for example, may be at least one selected from the group consisting of methyl acetate, ethyl acetate, propyl acetate, methyl propionate, ethyl propionate, propyl propionate, and butyl propionate. Specifically, the linear ester-based solvent may be ethyl propionate, propyl propionate, and a mixture thereof, and may more specifically be a mixture of ethyl propionate and propyl propionate.

Preferably, the organic solvent may include the cyclic carbonate-based solvent and the linear ester-based solvent. In a case in which a combination of the cyclic carbonate-based solvent and the linear ester-based solvent is used as the organic solvent, long-term cycle characteristics are not only further improved, but decomposition of the organic solvent is also suppressed during high-voltage operation to be able to obtain an effect of improving swelling characteristics.

In this case, the cyclic carbonate-based solvent may be included in an amount of 10 wt % to 50 wt %, preferably 20 wt % to 50 wt %, and more preferably 25 wt % to 40 wt % based on a total weight of the organic solvent. Also, the linear ester-based solvent may be included in an amount of 50 wt % to 90 wt %, preferably 50 wt % to 80 wt %, and more preferably 60 wt % to 75 wt % based on the total weight of the organic solvent. When the amounts of the cyclic carbonate-based solvent and the linear ester-based solvent satisfy the above ranges, an effect of improving the long-term cycle characteristics and high-voltage swelling characteristics is better.

Specifically, the organic solvent may include the cyclic carbonate-based solvent and propionate-based solvent in a weight ratio of 10:90 to 50:50, preferably 20:80 to 50:50, and more preferably 25:75 to 40:60.

In terms of an effect of improving high-voltage stability, the linear ester-based solvent may include propyl propionate. In this case, the propyl propionate may be included in an amount of 30 wt % to 70 wt %, preferably 35 wt % to 70 wt %, and more preferably 40 wt % to 60 wt % based on the total weight of the organic solvent. When the amount of the propyl propionate satisfies the above range, the high-voltage swelling characteristics may be further improved.

More specifically, in the present invention, the organic solvent may include ethylene carbonate, propylene carbonate, ethyl propionate, and propyl propionate.

In this case, the ethylene carbonate may be included in an amount of 10 wt % to 35 wt %, preferably 15 wt % to 30 wt %, and more preferably 15 wt % to 25 wt % based on the total weight of the organic solvent.

The propylene carbonate may be included in an amount of 5 wt % to 25 wt %, preferably 5 wt % to 20 wt %, and more preferably 5 wt % to 15 wt % based on the total weight of the organic solvent.

The ethyl propionate may be included in an amount of 10 wt % to 30 wt %, preferably 15 wt % to 30 wt %, and more preferably 15 wt % to 25 wt % based on the total weight of the organic solvent.

The propyl propionate may be included in an amount of 30 wt % to 70 wt %, preferably 35 wt % to 65 wt %, and more preferably 40 wt % to 60 wt % based on the total weight of the organic solvent.

(2) Lithium Salt

Various lithium salts typically used in an electrolyte solution for a lithium secondary battery may be used as the lithium salt used in the present invention without limitation. For example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiFSI ($LiN(SO_2F)_2$), $LiCH_3SO_3$, $LiCF_3CO_2$, $LiCH_3CO_2$, and LiBETI ($LiN(SO_2CF_2CF_3)_2$). Specifically, the lithium salt may include a single material selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI ($LiN(SO_2F)_2$), and LiBETI ($LiN(SO_2CF_2CF_3)_2$), or a mixture of two or more thereof.

The lithium salt may be included in a concentration of 0.8 M to 4.0 M, preferably 0.8 M to 2 M, and more preferably 0.8 M to 1.6 M in an electrolyte solution. In a case in which the concentration of the lithium salt satisfies the above range, output characteristics of the battery may be improved by improving a lithium ion yield ($Li^+$ transference number) and a degree of dissociation of the lithium ions.

(3) Compound Represented by Formula 1

The non-aqueous electrolyte of the present invention includes a dinitrile compound represented by the following Formula 1.

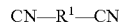

[Formula 1]

In Formula 1, $R^1$ is an unsaturated hydrocarbon group having 2 to 10 carbon atoms which includes at least one double bond. In this case, the unsaturated hydrocarbon group may be a linear or branched unsaturated hydrocarbon group.

Specifically, the dinitrile compound may be at least one selected from the group consisting of 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene, and 1,4-dicyano-2-butene is particularly preferred among them. The 1,4-dicyano-2-butene has an appropriate chain length to be able to prevent an excessive increase in resistance when a positive electrode film is formed, and has excellent electrochemical oxidation/reduction stability to be able to achieve excellent life characteristics.

The dinitrile compound represented by Formula 1 is a compound in which cyano groups are bonded to both ends of the unsaturated hydrocarbon group containing at least one double bond, wherein a binding force with transition metal is better than that of nitrile compounds containing a saturated hydrocarbon group, such as succinonitrile or hexane tricyanide. Thus, it may suppress a side reaction between the transition metal and the electrolyte solution by effectively trapping transition metal ions, which are dissolved from the positive electrode during charge and discharge, even with a smaller amount than that of the nitrile compounds containing a saturated hydrocarbon group.

The compound represented by Formula 1 may be included in an amount of 0.1 wt % to 3 wt %, preferably 0.5 wt % to 3 wt %, and more preferably 0.5 wt % to 2 wt % based on a total weight of the non-aqueous electrolyte. In a case in which the amount of the compound represented by Formula 1 satisfies the above range, excellent life characteristics may be achieved in a high-voltage battery while an increase in resistance is minimized.

(4) Compound Represented by Formula 2

The non-aqueous electrolyte of the present invention includes a sultone-based compound represented by the following Formula 2.

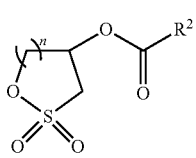

[Formula 2]

In Formula 2, n is an integer of 1 or 2, and $R^2$ is hydrogen, an unsubstituted or substituted alkyl group having 1 to 10 carbon atoms, or an unsubstituted or substituted alkoxy group having 1 to 10 carbon atoms, preferably an unsubstituted or substituted alkyl group having 1 to 5 carbon atoms, and more preferably an unsubstituted or substituted alkyl group having 1 to 4 carbon atoms.

Specifically, the compound represented by Formula 2 may be at least one selected from the group consisting of compounds represented by Formula 2a to Formula 2e below.

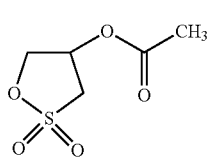

[Formula 2a]

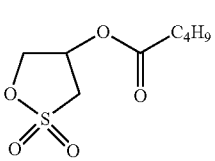

[Formula 2b]

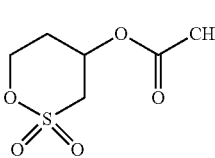

[Formula 2c]

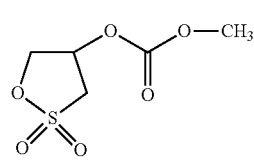

[Formula 2d]

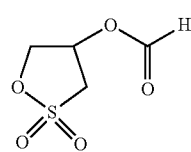

[Formula 2e]

2-acetoxy-1,3-propanesultone represented by Formula 2a is particularly preferred among them. Since the 2-acetoxy-1,3-propanesultone has excellent electrochemical oxidation/reduction stability, it may more effectively form a film on an electrode than other materials, and, as a result, an effect of improving the life characteristics may be obtained.

With respect to a high-voltage battery, by-products are increased on a surface of a negative electrode due to the dissolution of the transition metal or an increase in side reaction on the surface of the electrode, and, as a result, resistance increases so that lifetime tends to degrade, wherein, in a case in which a cyclic sultone compound containing an ester substituent is used as an additive as described above, since a film having lower resistance may be formed in comparison to a case where an unsubstituted sultone compound or a sultone-based compound containing another substituent is used, it is particularly preferred for the high-voltage battery.

The compound represented by Formula 2 may be included in an amount of 0.1 wt % to 3 wt %, preferably 0.5 wt % to 3 wt %, and more preferably 1 wt % to 3 wt % based on the total weight of the non-aqueous electrolyte. In a case in which the amount of the compound represented by Formula 2 satisfies the above range, excellent life characteristics may be achieved in a high-voltage battery.

When the amount of the compound represented by Formula 1 in the non-aqueous electrolyte according to the present invention is X wt % and the amount of the compound represented by Formula 2 is Y wt % based on a total weight of the non-aqueous electrolyte, the compound represented by Formula 1 and the compound represented by Formula 2 are included in amounts that satisfy X+Y≤5 and X≤Y. That is, a sum of the amounts of the compound represented by Formula 1 and the compound represented by Formula 2 is 5 wt % or less, preferably 1 wt % to 5 wt %, and more preferably 1.5 wt % to 5 wt %, and it is desirable that the compound represented by Formula 1 and the compound represented by Formula 2 are included such that the amount of the compound represented by Formula 1 is the same as or smaller than the amount of the compound represented by Formula 2.

According to the studies of the present inventors, in a case in which X+Y is greater than 5 or X>Y, there is little or no life characteristics improvement effect in comparison to a case where other additives are used.

Preferably, the compound represented by Formula 1 and the compound represented by Formula 2 may be included in a weight ratio of 1:1 to 1:3, for example, 1:1.5 to 1:2.5. When a mixing ratio of the compound represented by Formula 1 and the compound represented by Formula 2 satisfies the above range, low-temperature life characteristics and high-temperature life characteristics of the high-voltage battery are better.

(5) Compound Represented by Formula 3

The non-aqueous electrolyte of the present invention may further include a compound represented by the following Formula 3, if necessary.

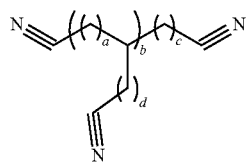

[Formula 3]

In Formula 3, a, b, c, and d may each independently be one of an integer of 1 to 5, preferably one of an integer of 1 to 4, and more preferably one of an integer of 1 to 3.

The compound represented by Formula 3 is a compound having three cyanide groups, wherein it may specifically be hexane tri-cyanide, and, for example, may be 1,3,6-hexane tricyanide or 1,2,6-hexane tricyanide.

The compound represented by Formula 3 has an effect of suppressing reduction of the dissolved transition metal ions to the negative electrode by binding with the dissolved transition metal in the electrolyte. Particularly, since the compound represented by Formula 3 has a relatively larger volume than other additives, binding probability with the transition metal dissolved into the electrolyte is high, and thus, transition metal trapping performance is excellent. Therefore, in a case in which the compound represented by Formula 3 is further included, the high-temperature life characteristics may be further improved.

The compound represented by Formula 3 may be included in an amount of 0.1 wt % to 3 wt %, for example, 0.5 wt % to 3 wt % based on the total weight of the non-aqueous electrolyte. In a case in which the amount of the compound represented by Formula 3 satisfies the above range, an effect of improving capacity characteristics and life characteristics after high-temperature storage is excellent.

Preferably, the non-aqueous electrolyte according to the present invention may include 0.5 wt % to 3 wt % of the compound represented by Formula 1, 0.5 wt % to 3 wt % of the compound represented by Formula 2, and 0.5 wt % to 3 wt % of the compound represented by Formula 3. In a case in which the amounts of the additives satisfy the above ranges, life characteristics and capacity characteristics of the high-voltage battery may be improved while an increase in resistance is minimized.

(6) Additives

Although not essential, the non-aqueous electrolyte according to the present invention may further include additives in order to further improve physical properties of the secondary battery.

Examples of the additive may be at least one selected from the group consisting of a cyclic carbonate-based compound, a halogen-substituted carbonate-based compound, a sultone-based compound, a sulfate-based compound, a phosphate-based compound, a borate-based compound, a benzene-based compound, an amine-based compound, a silane-based compound, and a lithium salt-based compound.

The cyclic carbonate-based compound, for example, may be vinylene carbonate (VC) or vinyl ethylene carbonate (VEC).

The halogen-substituted carbonate-based compound, for example, may be fluoroethylene carbonate (FEC).

The sultone-based compound, for example, may be 1,3-propane sultone or 1,3-propene sultone.

The sulfate-based compound, for example, may be ethylene sulfate (Esa), trimethylene sulfate (TMS), or methyl trimethylene sulfate (MTMS).

The phosphate-based compound, for example, may be at least one compound selected from the group consisting of lithium difluoro bis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound, for example, may be tetraphenylborate or lithium oxalyldifluoroborate (LiODFB).

The benzene-based compound, for example, may be fluorobenzene, the amine-based compound may be triethanolamine or ethylenediamine, and the silane-based compound may be tetravinylsilane.

The lithium salt-based compound is a compound different from the lithium salt included in the non-aqueous electrolyte solution, wherein the lithium salt-based compound may be at least one compound selected from the group consisting of $LiPO_2F_2$, LiODFB, LiBOB (lithium bis(oxalato)borate (LiB$(C_2O_4)_2$)), and $LiBF_4$.

The above additives may be used alone, or two or more thereof may be mixed and used.

A total amount of the additives may be in a range of 1 wt % to 20 wt %, for example, 1 wt % to 15 wt % based on the total weight of the non-aqueous electrolyte. In a case in which the additive is included in an amount within the above range, occurrence of a side reaction during an initial activation process of the secondary battery or residue or precipitation of the additive may be prevented while a film may be stably formed on the electrode and an ignition phenomenon during overcharge may be suppressed.

Lithium Secondary Battery

Next, a lithium secondary battery according to the present invention will be described.

The lithium secondary battery according to the present invention includes an electrode assembly including a positive electrode, a negative electrode, and a separator disposed between the positive electrode and the negative electrode, and a non-aqueous electrolyte. In this case, the non-aqueous electrolyte is the non-aqueous electrolyte according to the present invention. Since the non-aqueous electrolyte has been described above, a description thereof will be omitted and other components will be described below.

(1) Electrode Assembly

The electrode assembly includes at least one positive electrode, at least one negative electrode, and at least one separator.

The positive electrode may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically be a lithium transition metal oxide including lithium and at least one transition metal such as cobalt, manganese, nickel, or aluminum. Specifically, the lithium transition metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y2}Mn_{Y2}O_2$ (where 0<Y2<1), $LiMn_{2-Z}Ni_ZO_4$ (where 0<Z<2)), lithium-nickel-cobalt-based oxide (e.g., $LiNi_{1-Y1}Co_{Y1}O_2$ (where 0<Y1<1)), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2)), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and S2 are atomic fractions of each independent elements, wherein 0<p2<1, 0<q2<1, 0<r3<1, 0≤S2<1, and p2+q2+r3+S2=1), and any one thereof or a compound of two or more thereof may be included.

Specifically, the positive electrode active material may be a lithium cobalt-based oxide represented by Formula 4 below.

$$LiCo_{1-x}M^1_xO_2 \quad [\text{Formula 4}]$$

In Formula 4, $M^1$ is a doping element substituted for cobalt sites and may be at least one selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

x represents an atomic ratio of the doping element $M^1$ substituted for the cobalt sites, wherein 0≤x≤0.2, for example, 0≤x≤0.1.

The positive electrode active material may be included in an amount of 80 wt % to 99.9 wt %, for example, 85 wt % to 99 wt % based on a total weight of the positive electrode active material layer.

Next, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0.1 wt % to 10 wt %, for example, 0.1 wt % to 5 wt % based on the total weight of the positive electrode active material layer.

Next, the binder improves the adhesion between the positive electrode active material particles and the adhesion between the positive electrode active material and a current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode current collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode current collector.

The positive electrode current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode current collector may typically have a thickness of 3 μm to 500 μm, and microscopic irregularities may be formed on the surface of the current collector to improve the adhesion of the positive electrode material. The positive electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

Next, a negative electrode will be described.

The negative electrode according to the present invention includes a negative electrode active material layer including a negative electrode active material, and the negative electrode active material layer may further include a conductive agent and/or a binder, if necessary.

As the negative electrode active material, various negative electrode active materials used in the art, for example, a carbon-based negative electrode active material, a silicon-based negative electrode active material, or a metal alloy may be used.

As the carbon-based negative electrode active material, various carbon-based negative electrode active materials used in the art, for example, graphite-based materials such as natural graphite, artificial graphite, and Kish graphite; pyrolytic carbon, mesophase pitch based carbon fiber, mesocarbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

The silicon-based negative electrode active material may include at least one selected from the group consisting of metallic silicon (Si), silicon oxide ($SiO_x$, where 0<x<2), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), sulfur (S), selenium (Se), tellurium (Te), polonium (Po), and a combination thereof.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The negative electrode may be prepared by a method of preparing a negative electrode which is known in the art. For example, the negative electrode may be prepared by a method in which a negative electrode current collector is coated with a negative electrode slurry, which is prepared by dissolving or dispersing the negative electrode active material as well as optionally the binder and the conductive agent in a solvent, rolled and dried, or may be prepared by casting the negative electrode slurry on a separate support and then laminating a film separated from the support on the negative electrode current collector.

The negative electrode current collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode current collector may typically have a thickness of 3 µm to 500 µm, and, similar to the positive electrode current collector, microscopic irregularities may be formed on the surface of the current collector to improve the adhesion of the negative electrode active material. The negative electrode current collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

Next, a separator will be described.

The separator separates the positive electrode and the negative electrode and provides a movement path of lithium ions by being disposed between the negative electrode and the positive electrode, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

As the electrode assembly, various electrode assemblies known in the art, for example, a jelly-roll type electrode assembly, a stacked type electrode assembly, or a stack and folding type electrode assembly, may be used without limitation, and their structures or shapes are not particularly limited. However, in a case in which the electrode assembly is the stack and folding type electrode assembly, a particularly useful effect may be obtained.

The stack and folding type electrode assembly denotes an electrode assembly having a structure in which unit cells composed of the positive electrode, the negative electrode, and the separator are wound by a long continuous separation film, wherein it has the advantage of being easy to prepare and having excellent stability, but there is a problem in that long-term life characteristics are degraded because resistance is increased when charge and discharge are repeated. However, since the above-described non-aqueous electrolyte of the present invention has an excellent effect of suppressing an increase in resistance, excellent long-term life characteristics may be obtained when the stack and folding type electrode assembly and the non-aqueous electrolyte of the present invention are used together.

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in more detail, according to specific examples.

Example 1

<Electrolyte Preparation>

After $LiPF_6$ was dissolved in an organic solvent, in which ethylene carbonate (EC), propylene carbonate (PC), ethyl propionate (EP), and propyl propionate (PP) were mixed in a weight ratio of 20:10:20:50, such that a concentration of the $LiPF_6$ was 1.2 M, a non-aqueous electrolyte was prepared by adding 1 wt % of 1,4-dicyano-2-butene (DCB) and 1 wt % of 2-acetoxy-1,3-propanesultone (NR06).

<Electrode Assembly Preparation>

A positive electrode active material, a conductive agent, and a binder were mixed in a N-methylpyrrolidone solvent at a weight ratio of 97.5:1.2: 1.3 to prepare a positive electrode material mixture. In this case, $LiCoO_2$ was used as the positive electrode active material, carbon black was used as the conductive agent, and PVDF was used as the binder. Both surfaces of a 10 μm thick aluminum current collector were coated with the prepared positive electrode material mixture, dried at 130° C., and then roll-pressed to prepare a positive electrode.

Next, a negative electrode active material, a binder, and a conductive agent were mixed in water at a weight ratio of 95.8:1.7: 2.5 to prepare a negative electrode material mixture. Artificial graphite was used as the negative electrode active material, carbon black was used as the conductive agent, and PVDF was used as the binder. Both surfaces of a 6 μm thick copper current collector were coated with the prepared negative electrode material mixture, dried at 60° C., and then roll-pressed to prepare a negative electrode.

After seven bi-cells having a structure of positive electrode/separator/negative electrode/separator/positive electrode and one mono cell having a structure of negative electrode/separator/positive electrode were prepared by disposing a separator between the positive electrode and the negative electrode prepared as described above, the seven bi-cells and one mono cell were wound with a long separation film to prepare a stack and folding type electrode assembly.

<Preparation of Secondary Battery>

The above-prepared electrode assembly was accommodated in a pouch type secondary battery case, and the above-prepared non-aqueous electrolyte was injected thereinto to prepare a lithium secondary battery.

Example 2

A non-aqueous electrolyte was prepared in the same manner as in Example 1 except that 2-acetoxy-1,3-propanesultone (NR06) was added in an amount of 2 wt % instead of 1 wt %.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Example 3

A non-aqueous electrolyte was prepared in the same manner as in Example 1 except that 2-acetoxy-1,3-propanesultone (NR06) was added in an amount of 3 wt % instead of 1 wt %.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Example 4

A non-aqueous electrolyte was prepared in the same manner as in Example 1 except that 3 wt % of 1,3,6-hexanetricyanide (HTCN) was additionally added.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Example 5

A non-aqueous electrolyte, an electrode assembly, and a lithium secondary battery were prepared in the same manner as in Example 1 except that 2 wt % of 1,4-dicyano-2-butene (DCB) and 3 wt % of 2-acetoxy-1,3-propanesultone (NR06) were added.

Example 6

A non-aqueous electrolyte, an electrode assembly, and a lithium secondary battery were prepared in the same manner as in Example 1 except that 1 wt % of 1,4-dicyano-2-butene (DCB) and 4 wt % of 2-acetoxy-1,3-propanesultone (NR06) were added.

Example 7

A non-aqueous electrolyte, an electrode assembly, and a lithium secondary battery were prepared in the same manner as in Example 1 except that 2 wt % of 1,4-dicyano-2-butene (DCB) and 2 wt % of 2-acetoxy-1,3-propanesultone (NR06) were added.

Comparative Example 1

A non-aqueous electrolyte was prepared in the same manner as in Example 1 except that 2-acetoxy-1,3-propanesultone (NR06) was added in an amount of 5 wt % instead of 1 wt %.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 2

A non-aqueous electrolyte was prepared in the same manner as in Example 1 except that 3 wt % of 1,4-dicyano-2-butene (DCB) and 2 wt % of 2-acetoxy-1,3-propanesultone (NR06) were added instead of 1 wt % of 1,4-dicyano-2-butene (DCB) and 1 wt % of 2-acetoxy-1,3-propanesultone (NR06).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 3

A non-aqueous electrolyte was prepared in the same manner as in Example 1 except that 5 wt % of 1,4-dicyano-2-butene (DCB) and 2 wt % of 2-acetoxy-1,3-propanesultone (NR06) were added instead of 1 wt % of 1,4-dicyano-2-butene (DCB) and 1 wt % of 2-acetoxy-1,3-propanesultone (NR06).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 4

A non-aqueous electrolyte was prepared in the same manner as in Example 1 except that 2-acetoxy-1,3-propanesultone (NR06) was not added.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 5

A non-aqueous electrolyte was prepared in the same manner as in Example 1 except that 1,4-dicyano-2-butene (DCB) was not added.

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 6

A non-aqueous electrolyte was prepared in the same manner as in Example 1 except that 2 wt % of 1,3-propanesultone (PS) was added instead of 1 wt % of 2-acetoxy-1,3-propanesultone (NR06).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 7

A non-aqueous electrolyte was prepared in the same manner as in Example 1 except that 1 wt % of succinonitrile (SN) was added instead of 1 wt % of 1,4-dicyano-2-butene (DCB).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 8

A non-aqueous electrolyte was prepared in the same manner as in Example 1 except that 1 wt % of succinonitrile (SN) and 2 wt % of 1,3-propanesultone (PS) were added instead of 1 wt % of 1,4-dicyano-2-butene (DCB) and 1 wt % of 2-acetoxy-1,3-propanesultone (NR06).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 9

A non-aqueous electrolyte was prepared in the same manner as in Example 1 except that 1 wt % of succinonitrile (SN), 2 wt % of 1,3-propanesultone (PS), and 3 wt % of 1,3,6-hexanetricyanide (HTCN) were added instead of 1 wt % of 1,4-dicyano-2-butene (DCB) and 1 wt % of 2-acetoxy-1,3-propanesultone (NR06).

Then, an electrode assembly and a lithium secondary battery were prepared in the same manner as in Example 1 except that the non-aqueous electrolyte prepared by the above method was used instead of the non-aqueous electrolyte of Example 1 as a non-aqueous electrolyte.

Comparative Example 10

A non-aqueous electrolyte, an electrode assembly, and a lithium secondary battery were prepared in the same manner as in Example 1 except that 3 wt % of 1,4-dicyano-2-butene (DCB) and 3 wt % of 2-acetoxy-1,3-propanesultone (NR06) were added.

Comparative Example 11

A non-aqueous electrolyte, an electrode assembly, and a lithium secondary battery were prepared in the same manner as in Example 1 except that 3 wt % of 1,4-dicyano-2-butene (DCB) and 1 wt % of 2-acetoxy-1,3-propanesultone (NR06) were added.

Experimental Example 1—Low-Temperature Cycle Characteristics

Each of the lithium secondary batteries prepared by Examples 1 to 7 and Comparative Examples 1 to 11 was charged at 1.0 C to 4.47 V (0.05 C cut off) under a constant current/constant voltage (CC/CV) condition at 15° C. Subsequently, each lithium secondary battery was discharged at a CC of 1.0 C to 3.0 V.

The above charging and discharging were set as one cycle and, after this cycle was performed 100 times, capacity retention after 100 cycles relative to initial capacity was measured. Measurement results are illustrated in Table 1 below.

Experimental Example 2—High-Temperature Cycle Characteristics

Each of the lithium secondary batteries prepared by Examples 1 to 7 and Comparative Examples 1 to 11 was charged at 1.0 C to 4.47 V (0.05 C cut off) under a constant current/constant voltage (CC/CV) condition at 45° C. Subsequently, each lithium secondary battery was discharged at a CC of 1.0 C to 3.0 V.

The above charging and discharging were set as one cycle and, after this cycle was performed 100 times, capacity retention after 100 cycles relative to initial capacity was measured. Measurement results are illustrated in Table 1 below.

TABLE 1

| | Additives | | | | | Experimental Example 1 Low-temperature capacity retention (%) | Experimental Example 2 High-temperature capacity retention (%) |
|---|---|---|---|---|---|---|---|
| | DCB | NR06 | HTCN | PS | SN | | |
| Example 1 | 1 | 1 | — | — | — | 96.1 | 95.7 |
| Example 2 | 1 | 2 | — | — | — | 97.2 | 96.6 |
| Example 3 | 1 | 3 | — | — | — | 96.6 | 96.2 |
| Example 4 | 1 | 1 | 3 | — | — | 94.8 | 97.3 |
| Example 5 | 2 | 3 | — | — | — | 95.8 | 97.5 |
| Example 6 | 1 | 4 | — | — | — | 94.5 | 94.7 |
| Example 7 | 2 | 2 | — | — | — | 96.1 | 97.9 |
| Comparative Example 1 | 1 | 5 | — | — | — | 92.5 | 92.9 |
| Comparative Example 2 | 3 | 2 | — | — | — | 93.3 | 94.4 |
| Comparative Example 3 | 5 | 2 | — | — | — | 87.8 | 90.5 |
| Comparative Example 4 | 1 | — | — | — | — | 73.5 | 78.6 |
| Comparative Example 5 | — | 1 | — | — | — | 85.7 | 80.2 |
| Comparative Example 6 | 1 | — | — | 2 | — | 92.9 | 94.1 |
| Comparative Example 7 | — | 1 | — | — | 1 | 95.5 | 93.6 |
| Comparative Example 8 | — | — | — | 2 | 1 | 92.7 | 93.3 |
| Comparative Example 9 | — | — | 3 | 2 | 1 | 91.8 | 94.2 |
| Comparative Example 10 | 3 | 3 | — | — | — | 92.8 | 94.3 |
| Comparative Example 11 | 3 | 1 | — | — | — | 92.4 | 93.6 |

As illustrated in Table 1, with respect to the lithium secondary batteries of Examples 1 to 7 prepared by using the non-aqueous electrolytes that contained dicyano-2-butene (DCB) and 2-acetoxy-1,3-propanesultone (NR06) to satisfy the amount range of the present invention, the lithium secondary batteries exhibited excellent low-temperature capacity retention and high-temperature capacity retention even during operation at a high voltage of 4.47 V.

In contrast, with respect to the lithium secondary batteries which used the non-aqueous electrolytes of Comparative Examples 1 to 3, 10, and 11 containing dicyano-2-butene (DCB) and 2-acetoxy-1,3-propanesultone (NR06) in an amount outside the amount range of the present invention, the non-aqueous electrolytes of Comparative Examples 4 and 5 without containing dicyano-2-butene or 2-acetoxy-1, 3-propane sultone, and the non-aqueous electrolytes of Comparative Examples 6 to 9 using a combination of different types of additives, it was found that low-temperature capacity retentions and high-temperature capacity retentions were lowered than those of the batteries of the examples, and, particularly, it was found that the high-temperature capacity retentions were significantly reduced.

The invention claimed is:

1. A non-aqueous electrolyte, comprising:
an organic solvent;
a lithium salt;
a compound represented by Formula 1; and
a compound represented by Formula 2,
wherein, when an amount of the compound represented by Formula 1 is X wt % and an amount of the compound represented by Formula 2 is Y wt % based on a total weight of the non-aqueous electrolyte, $X+Y \leq 5$ and $X \leq Y$, and
wherein non-aqueous electrolyte does not comprise lithium difluorophosphate, $$CN-R^1-CN \quad \text{[Formula 1]}$$

wherein, in Formula 1, $R^1$ is an unsaturated hydrocarbon group having 2 to 10 carbon atoms which includes at least one double bond,

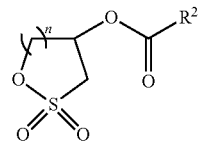

[Formula 2]

wherein, in Formula 2, n is an integer of 1 or 2, and $R^2$ is hydrogen, an unsubstituted or substituted alkyl group having 1 to 10 carbon atoms, or an unsubstituted or substituted alkoxy group having 1 to 10 carbon atoms.

2. The non-aqueous electrolyte of claim 1, wherein the compound represented by Formula 1 is 1,4-dicyano-2-butene.

3. The non-aqueous electrolyte of claim 1, wherein the compound represented by Formula 2 is 2-acetoxy-1,3-propanesultone.

4. The non-aqueous electrolyte of claim 1, wherein the compound represented by Formula 1 is present in an amount of 0.1 wt % to 3 wt % based on the total weight of the non-aqueous electrolyte.

5. The non-aqueous electrolyte of claim 1, wherein the compound represented by Formula 2 is present in an amount of 0.1 wt % to 3 wt % based on the total weight of the non-aqueous electrolyte.

6. The non-aqueous electrolyte of claim 1, wherein a weight ratio of the compound represented by Formula 1 to the compound represented by Formula 2 is 1:1 to 1:3.

7. The non-aqueous electrolyte of claim 1, further comprising a compound represented by Formula 3,

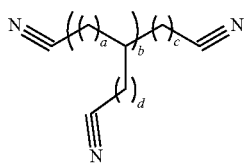

[Formula 3]

wherein, in Formula 3, a, b, c, and d are each independently an integer of 1 to 5.

8. The non-aqueous electrolyte of claim 7, wherein the compound represented by Formula 3 is hexane tri-cyanide.

9. The non-aqueous electrolyte of claim 7, wherein the compound represented by Formula 3 is present in an amount of 0.1 wt % to 3 wt % based on the total weight of the non-aqueous electrolyte.

10. The non-aqueous electrolyte of claim 7, wherein the non-aqueous electrolyte comprises:
   0.5 wt % to 3 wt % of the compound represented by Formula 1;
   0.5 wt % to 3 wt % of the compound represented by Formula 2; and
   0.5 wt % to 3 wt % of the compound represented by Formula 3 based on the total weight of the non-aqueous electrolyte.

11. The non-aqueous electrolyte of claim 1, wherein the organic solvent comprises a cyclic carbonate-based solvent and a propionate-based solvent.

12. The non-aqueous electrolyte of claim 11, wherein the organic solvent comprises the cyclic carbonate-based solvent and the propionate-based solvent in a weight ratio of 10:90 to 50:50.

13. A lithium secondary battery, comprising:
   an electrode assembly, wherein the electrode assembly includes at least one positive electrode, at least one negative electrode, and at least one separator disposed between the at least one positive electrode and the at least one negative electrode; and
   the non-aqueous electrolyte of claim 1.

14. The lithium secondary battery of claim 13, wherein the lithium secondary battery is operated at a voltage of 4.45 V or higher.

15. The lithium secondary battery of claim 13, wherein the electrode assembly is a stack and folding type electrode assembly in which unit cells are wound by a long continuous separation film.

* * * * *